Figure 1:
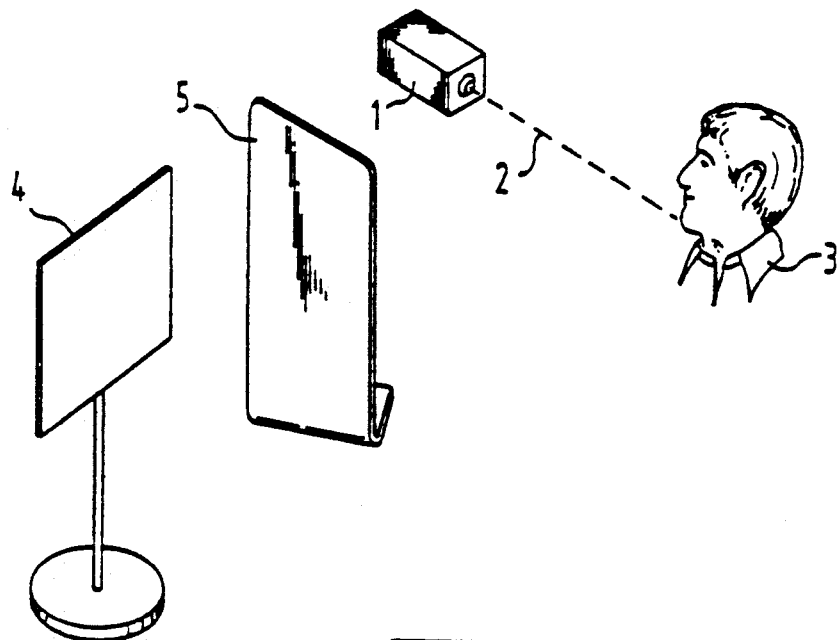

United States Patent [19]

Grossetie et al.

[11] Patent Number: 5,235,442
[45] Date of Patent: Aug. 10, 1993

[54] METHOD FOR THE RECORDING AND FOR THE VISUAL RESTITUTION OF A TRIDIMENSIONAL SCENE

[75] Inventors: Jean Claude Grossetie; Marco Franchi, both of Ispra, Italy

[73] Assignee: European Economic Community, Luxembourg

[21] Appl. No.: 856,167

[22] PCT Filed: Oct. 8, 1990

[86] PCT No.: PCT/EP90/01684

§ 371 Date: Apr. 2, 1992

§ 102(e) Date: Apr. 2, 1992

[87] PCT Pub. No.: WO91/06045

PCT Pub. Date: May 2, 1991

[30] Foreign Application Priority Data

Oct. 11, 1989 [LU] Luxembourg .................. 87 606

[51] Int. Cl.⁵ .................................................. G03H 1/26
[52] U.S. Cl. ........................................ 359/22; 359/1; 359/28
[58] Field of Search .................. 359/1, 10, 22, 28, 32

[56] References Cited

U.S. PATENT DOCUMENTS

| | | | |
|---|---|---|---|
| 4,717,221 | 1/1988 | McGrew | 359/15 |
| 4,783,133 | 11/1988 | Chen | 359/23 |
| 5,138,471 | 8/1992 | McGrew | 359/22 |

OTHER PUBLICATIONS

P. Harihan "Optical holography: Principles, Techniques and Applications", 1984, Cambridge University Press, ISBN 0521243483.

Applied Optics, vol. 27, No. 12, Jun. 15, 1988, (New York, US), M. Trivi et al.: "Three dimensional display through speckle patterns: a single exposure method", pp. 2370-2371.

Applied Optics, vol. 22, No. 6, Mar. 15, 1983, (New York, US), H. J. Rabal et al.: "Stereograms through a speckel carrier", pp. 881-885.

*Primary Examiner*—Bruce Y. Arnold
*Assistant Examiner*—J. P. Ryan
*Attorney, Agent, or Firm*—Sughrue, Mion, Zinn, Macpeak & Seas

[57] ABSTRACT

The invention relates to a method for the photographic recording and the visual restitution of a tridimensional scene by means of a coherent light source (1). According to the invention, in view of the photographic recording, a coherent light beam is projected onto said scene such that it illuminates only a small portion of the surface of the scene (3) and a photosensitive recording plate (4) is disposed in such a way that it receives diffuse light coming from said scene; in view of the visual restitution, a first face of said plate is illuminated by a coherent light beam while the second face of said plate is observed.

3 Claims, 1 Drawing Sheet

METHOD FOR THE RECORDING AND FOR THE VISUAL RESTITUTION OF A TRIDIMENSIONAL SCENE

The invention relates to a method for the recording and the visual restitution of a tridimensional scene by means of a coherent light source.

Such methods are known and are called holographic methods. Fringes resulting from an interference between a reference beam and the diffuse light coming from the scene are recorded on a photosensitive plate. During the restitution, the holographic plate is illuminated by a coherent source, and the image of the scene can be observed behind the hologram. Here, the visual range of the scene depends on the observation angle and on the distance at which observation takes place.

The invention intends to present a method of photographic recording and visual restitution of a scene allowing to reconstitute the visual field of the scene during restitution independently of the distance from which it is observed.

The invention uses a phenomenon which M. Francon has described in a book "La granularité laser (speckle) et ses applications en optique", edition Masson 1978. This speckle phenomenon observed on a photographic plate inscribed by a coherent source is generally considered as an annoying and inconvenient phenomenon. That is why it is eliminated as far as possible both in photographic and in holographic assemblies. It has been found surprisingly that by illuminating by a coherent source only a very narrow element of the surface of the scene during recording, there are recorded, on a photographic plate and in the form of speckles, all the informations not only concerning this element but also concerning all objects illuminated in a secondary way. In fact, these objects too receive the diffuse light and retransmit it towards the environment.

The invention will now be described more in detail means of three figures.

FIG. 1 shows diagrammatically the configuration between a coherent source, the scene and the photographic plate during recording.

Figure 2:
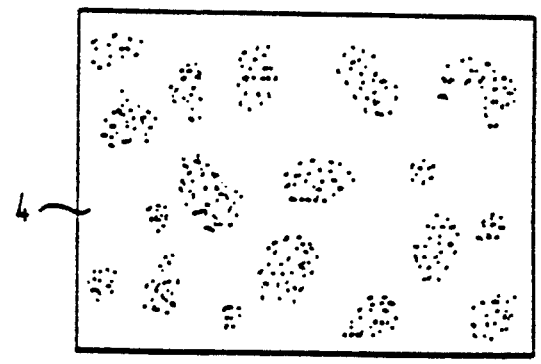
Figure 3:
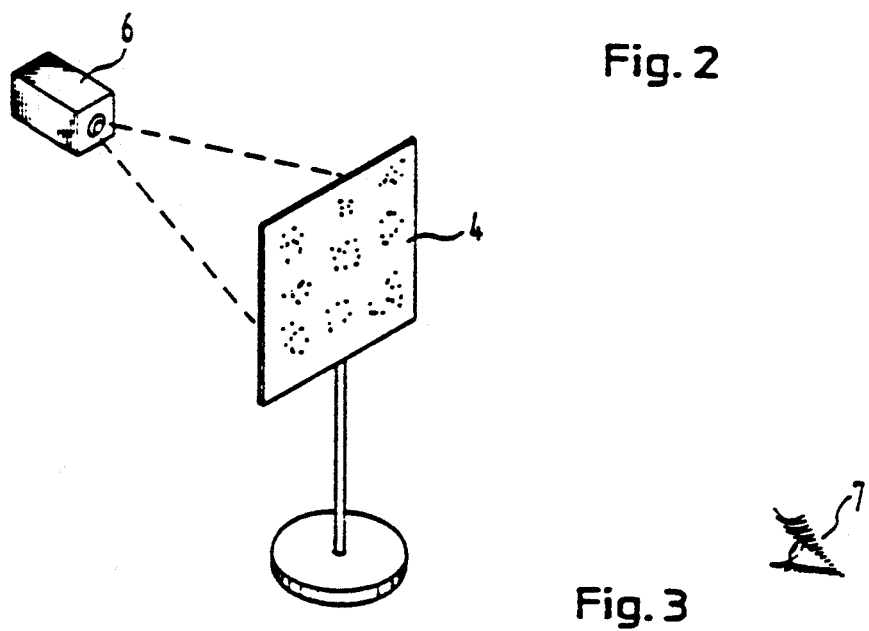

FIG. 2 gives the aspect of a photographic plate such as it is visible after recording of a scene, FIG. 3 indicates diagrammatically the configuration between the coherent source, the photographic plate and the observer during visual restitution of the scene.

With reference to FIG. 1, there is to be seen a coherent light source 1 constituted by a laser which emits a fine beam 2 towards an object 3, the image of which is to be recorded. The diameter of the beam 2 is voluntarily very reduced, for example some tenth of millimeters, and illuminates thus a very small portion of the scene 3. A photographic plate 4 is disposed to receive the light reflected from the scene 3. A screen 5 serves to avoid the direct passage of the light between the laser 1 and the photographic plate 4.

As a function of the roughness of the scenic element hit by the beam 2, a more or less large quantity of the energy of the coherent beam is diffused towards the other parts of the scene and towards the environing space. It is then observed that the photographic plate is printed in a very particular way. There are in fact to be seen (see FIG. 2) more or less dark spots of variable sizes and of a distribution which seems at a first glance equally random. This phenomenon is called a speckle.

It has to be noted here that there is a fundamental difference between classical holograms and the speckles according to the invention. In fact, up to now, it has been tried to uniformise as far as possible the beam illuminating the scene in order to illuminate all the portions of the scene in the same way. Here, on the contrary, the incident beam is concentrated as much as possible in order to obtain an intensity distribution which is as heterogenous as possible. Consequently, it is no more the whole scene which receives the incident light, but a very small portion of this scene.

By taking a photographic plate 4, inscribed as shown in FIG. 2, and by illuminating this plate 4 by a coherent light source 6, an observer 7 finds that the light is diffracted after having traversed the plate and reconstitutes the entirety of the original tridimensional scene. During observation of this image, it is found that the reconstituted optical field gives an evolutive vision of the scene. Contrary to holograms, the vision field of the scene depends on the observation angle and on the distance at which it is observed. No matter which direction is chosen for observation, there is always obtained a vision of the entire scene. Further, depending on the observation distance with respect to the plate 4, it is observed that the vision field of the scene changes (it grows or retracts), which is impossible to realise with classical holograms. Further, it is observed that the image does not change its aspect when the photographic plate is covered by half or more.

These exceptional features could be explained by means of the theory of the vectorial diffraction.

The study under microscope of the transparence contrast between the spots (see FIG. 2) has allowed to discover that the inner structure of the dark and light elements is analogous to local micro-holograms. These micro-holograms form a continuous and evolutive series over the whole sensitive surface of the plate.

Like the classical holograms, the micro-holograms form a continuous network of dark and light curves which superpose the spots of the speckle. Naturally, these curves are nothing else but the recording of continuous interference fields connected both to the surface element on which the incident laser beam is concentrated during recording and to the spatial scene which receives and re-emits the coherent light.

It can thus be stated that the laser speckle phenomenon is always associated with an assembly of continuous interference fields which superpose the laser granularity. This phenomenon has not been pointed out until now, since up to now, very large light beams were used which permitted to illuminate the whole scene. Under these circumstances, the sensitivity of the plates is not adapted and, in addition, the intensity ratios between the phenomena are of an order between them. With an illumination by a very fine beam, such as it is proposed according to the present invention, it is stated that the interaction between the beam and said element of the scene produces on the surface itself and in its neighbourhood a localized field of interferences. The local structure of these interferences is a function of the local roughness of the scene, and the micro-zones of an intensity which is not nul act all as individual coherent sources. The number of these secondary sources is very important and varies as a function of the number of microscopic roughnesses of the surface in question. Consequently, it can be concluded that the fact of concentrating a beam of coherent light onto an infinitesimal random portion of the surface of the scene leads to a simultaneous illumination of the environing space by a multitude of quasi-punctiform coherent sources, the equivalent emission intensities of which are quasi-identical. This fundamental fact allows to understand to a great extent why the speckle created by all the sources, and all the holograms coming from all the possible optical combinations can be registered at the same time.

The entirety of these micro-holograms forms a continuous interference network which actually constitutes a natural codification of the scene.

Thus, a particular plane interference network can be associated in a bi-univocal way to a tridimensional scene. The memorisation, the creation, the reconstitution and the transfer in analogous or digital form of the curves which constitute this network allow thus to work on a very compact codified representation of a spatial scene and no more, as is the case up to now, on representations of images which are plane by definition.

Already now, it can be estimated that the codification thus obtained represents an important gain with respect to the present state of the art and that this gain is at least of the order of 100.000. The method according to the invention presents important technical advantages and permits in particular to get rid of problems of vibration, of natural convection and of the stability of mechanical supports. It has to be underligned that there is no more a reference beam as in the holographic technique.

Finally, and this seems to be very important, this phenomenon seems to possess all the intrinsic properties of the natural vision.

Thus, the method according to the invention can be used for multiple scientific as well as industrial or artistical applications.

We claim:

1. A method of photographic recording and visual restitution of at least one tridimensional object by means of a coherent light source, comprising the steps of:

projecting a very fine coherent light beam onto said object such that said beam illuminates only a very small portion of the surface of said object, disposing a photographic recording plate, without the use of a lens, screened from said fine coherent light beam, in a position to receive diffuse light reflected from said object onto a first surface of said plate, and impinging light from a coherent light source on a reverse, second surface of said photographic plate and diffracting the light after traversing the plate thereby reconstituting the entirety of the original tridimensional object giving an evolutive vision of the object whereby the vision field of the object depends on the observation angle relative to the second surface of the photographic record plate, and wherein depending on the observation distance with respect to the photographic record plate, the vision field of the scene grows or retracts.

2. A method according to claim 1, wherein the coherent light source beam projected on said object is concentrated to illuminate a surface area of the object of about $10^{-7} m^2$.

3. The method according to claim 2, wherein the impingement of said very fine coherent light beam onto said object is concentrated to the extent possible to obtain an intensity distribution which is highly heterogeneous such that the interaction between the beam and the object produces on the surface thereof a localized field of interferences leading to a simultaneous illumination of the environing space by a multitude of quasi-punctiform coherent sources, permitting speckle created by all said sources constituted by said very small portion of the surface directly illuminated by said coherent light beam and that of the object illuminated in a secondary way by a light diffusely reflected from said very small surface area.

* * * * *